United States Patent
Lund (10) Patent No.: US 7,046,120 B2
(45) Date of Patent: *May 16, 2006

(54) SYSTEM AND METHOD FOR PROVIDING USER-SELECTED INFORMATION TO A PAGING-CAPABLE DEVICE

(75) Inventor: Arnold M. Lund, Louisville, CO (US)

(73) Assignees: SBC Knowledge Ventures L.P., Reno, NV (US); Micromuse, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/930,623

(22) Filed: Aug. 30, 2004

(65) Prior Publication Data

US 2005/0140499 A1 Jun. 30, 2005

Related U.S. Application Data (63) Continuation of application No. 10/409,915, filed on Apr. 8, 2003, which is a continuation of application No. 09/293,588, filed on Apr. 16, 1999, now abandoned, which is a continuation of application No. 08/892,925, filed on Jul. 15, 1997, now Pat. No. 5,936,547.

(51) Int. Cl.
*H04Q 7/14* (2006.01)

(52) U.S. Cl. .................................. 340/7.48; 340/7.29

(58) Field of Classification Search ............. 340/7.21, 340/7.29
See application file for complete search history.

(56) References Cited

U.S. PATENT DOCUMENTS

| | | | |
|---|---|---|---|
| 4,611,094 A | 9/1986 | Asmuth et al. | |
| 4,766,434 A | 8/1988 | Matai et al. | |
| 4,812,843 A | 3/1989 | Champion, III et al. | |
| 5,043,721 A | 8/1991 | May | |
| 5,045,850 A | 9/1991 | Andros et al. | |
| 5,263,195 A | 11/1993 | Panther et al. | |
| 5,416,473 A | 5/1995 | Dulaney, III et al. | |
| 5,473,143 A | 12/1995 | Vak et al. | |
| 5,473,667 A | 12/1995 | Neustein | |
| 5,506,886 A | 4/1996 | Maine | |
| 5,539,392 A | 7/1996 | Hays et al. | |
| 5,543,785 A | 8/1996 | Vatt | |
| 5,543,789 A | 8/1996 | Behr et al. | |
| 5,546,077 A | 8/1996 | Lipp et al. | |
| 5,555,446 A * | 9/1996 | Jasinski | 340/7.21 |
| 5,561,703 A | 10/1996 | Arledge | |

(Continued)

FOREIGN PATENT DOCUMENTS

| | | |
|---|---|---|
| CA | 2192545 | 1/1996 |
| CA | 2260264 | 1/1998 |

OTHER PUBLICATIONS

Octel User Reference Manual (p. 1) Octel Communications Corporation, 1994.

*Primary Examiner*—Brian Zimmerman
(74) *Attorney, Agent, or Firm*—Brinks Hofer Gilson & Lione (57) ABSTRACT

A system and method for providing user-selected information to a paging-capable device. An enhanced paging system responsive to information sources and a selection device transmits information to a paging-capable device. The enhanced paging system comprises a storing means, a selecting means, a storage device, and a transmitter. Such a system can provide user-selected information to a paging-capable device, allowing the user to control what information will be sent and when the information will be sent. Intelligent-agent software can automatically search for and store information that would be of interest to the user and can alert the user that more detailed information is available. It can also send critical information to the user without user request.

8 Claims, 5 Drawing Sheets

U.S. PATENT DOCUMENTS

| | | |
|---|---|---|
| 5,610,970 A | 3/1997 | Fuller et al. |
| 5,675,507 A | 10/1997 | Bobo |
| 5,809,415 A | 9/1998 | Rossmann |
| 5,838,252 A | 11/1998 | Kikinis |
| 5,839,054 A | 11/1998 | Wright |
| 5,936,547 A | 8/1999 | Lund |
| 5,937,347 A | 8/1999 | Gordon |
| 5,970,387 A | 10/1999 | Yuan |
| 5,974,447 A * | 10/1999 | Cannon et al. ............. 340/7.21 |
| 6,021,433 A * | 2/2000 | Payne et al. ............... 340/7.29 |
| 6,313,736 B1 | 11/2001 | Hymel et al. |
| 2003/0197596 A1 | 10/2003 | Lund |

* cited by examiner

SYSTEM AND METHOD FOR PROVIDING USER-SELECTED INFORMATION TO A PAGING-CAPABLE DEVICE

CROSS-REFERENCE TO RELATED APPLICATIONS

This application is a continuation of U.S. patent application Ser. No. 10/409,915, filed Apr. 8, 2003 (pending), which is a continuation of U.S. patent application Ser. No. 09/293,588, filed Apr. 16, 1999 (now abandoned), which is a continuation of U.S. patent application Ser. No. 08/892,925, filed Jul. 15, 1997 (now U.S. Pat. No. 5,936,547), each of which is hereby incorporated by reference.

TECHNICAL FIELD

The present invention relates generally to telecommunication services using a public telephone system and more specifically to enhanced services for a paging-capable device.

BACKGROUND OF THE INVENTION

Paging-capable devices are used to provide a user with a wide range of information. As used herein, a "paging-capable device" refers to a device that can receive information which is broadcast from a paging system. "Paging-capable devices" include, but are not limited to, pagers and portable computing devices (such as personal data assistants, calculators, electronic notebooks, calendars/electronic schedulers, and electronic information managers) that can receive information from an information source via standard page transmissions. When the paging-capable device receives information, it alerts the user in a way to get his attention. For example, a paging-capable device can emit an audible tone (e.g., a beeping sound) or can vibrate against the user's body.

The most common form of information is telephone paging codes sent through a phone network. An information sender (e.g., another person) typically enters his telephone number on a touch-tone keypad of a telephone. The user's paging-capable device (typically a pager) automatically receives the paging codes when they are sent by the other person and alerts the user to the incoming information. In this way, the user automatically receives information that is individually broadcast to him.

Additionally, the user can receive information that is broadcast to a group of subscribers. For example, a user can subscribe to a service in an information source (such as a news service on the Internet) which provides a particular type of information to a subscriber's paging-capable device. As with paging codes, the paging-capable device receives the information when the information source chooses to send it. When the information is received from the information source, the paging-capable device alerts the user.

Because the user has no control over when the information source sends information, incoming-information alerts can disturb the user at inconvenient times. Beyond merely annoying a user, frequent alerts can disrupt important meetings and generally lower productivity. This problem is aggravated by the increase in the number of information sources available (on the Internet, for example) and in the volume of available information from the sources. To avoid this problem, some users disable their paging-capable devices. While disabling the device prevents an alert, it also prevents important information, which may not be later retrievable, from reaching the user.

In addition to not having control over when information is received by the paging-capable device, the user typically has no control over what particular information is sent. Although a user can select a particular information source from which to receive information, he typically cannot select the particular information the source sends. Without this control, the user must spend time browsing through the entire set of information broadcast from the source until he finds the information of interest. Additionally, with multiple information sources, the volume of information automatically sent to the paging-capable device may exceed the memory capacity of the device, preventing additional, possibly more important, information from being received.

U.S. Pat. Nos. 5,555,446 and 4,812,843 disclose systems in which users have limited control over what information is sent and when it is sent. The system of the '446 patent allows a user to transmit an information request to a base station by entering a predetermined code via switches on a paging device. In that system, the paging device used to send the request is the same device that receives the requested information. If the user cannot remember or does not know the predetermined code for the information he desires to receive, he will not be able to request the information.

With the system of the '843 patent, a phone or a computer is used to enter predetermined codes to request information. As with the system of the '446 patent, if the user forgets the codes or does not have a list of codes nearby, he will not be able to make his request. In that system, before the user receives the requested information, the information is filtered by a third party—a human operator interprets the information and determines what information will be accessible to the user. In the systems of both the '446 and '843 patents, the information that the user can request is information that is addressed to and/or accessible by more than one user There is a need, therefore, to provide a system and method for paging-capable devices that overcome the problems described above.

DETAILED DESCRIPTION OF THE PRESENTLY PREFERRED EMBODIMENTS

Advantages

The preferred embodiments described below provide the user with control over when information is sent to his paging-capable device. With such control, the user can avoid being disturbed by incoming-information alerts at inconvenient times without having to disable his paging-capable device.

The preferred embodiments also provide the user with control over what particular information is sent to his paging-capable device. By receiving only desired information, the user avoids having to spend time browsing through an entire set of transmitted information. With this control, the user avoids exceeding the memory capacity of his paging-capable device, ensuring that important information sent to the device can be received.

First Preferred Embodiment

Figure 1:
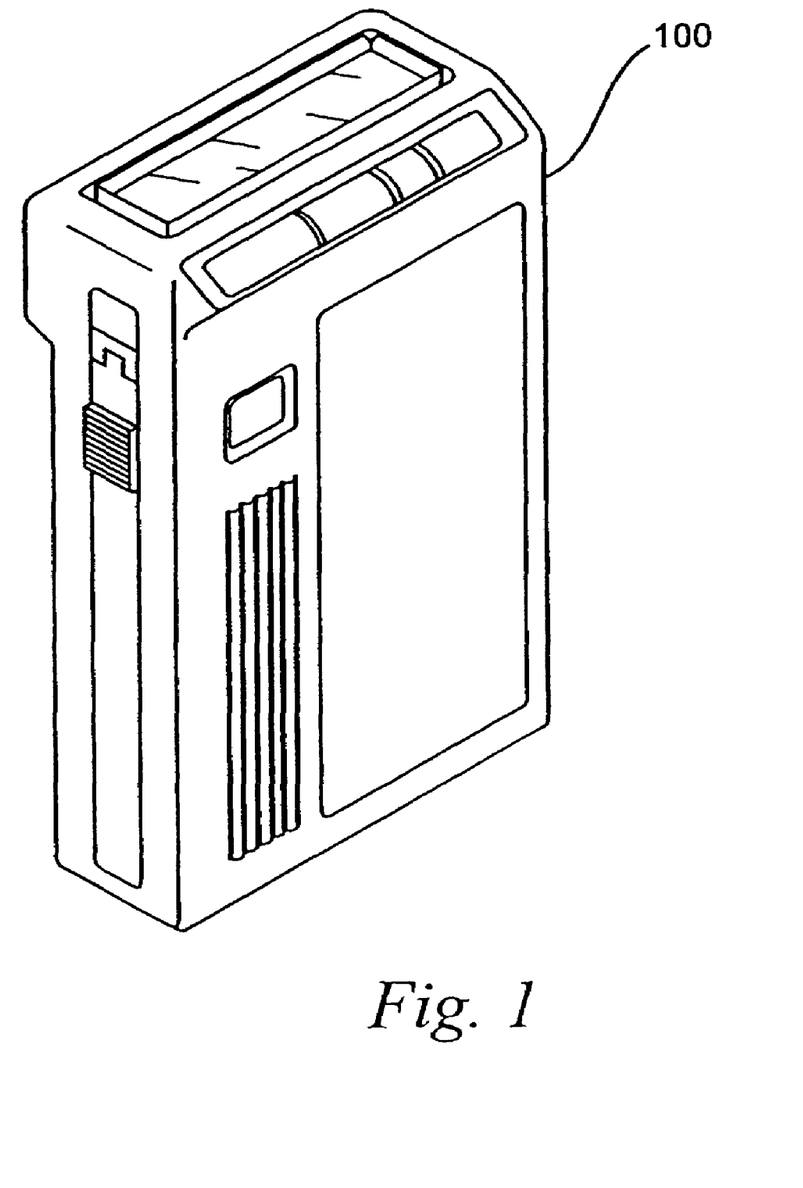
FIG. 1 is an illustration of a paging-capable device of a preferred embodiment.
Figure 2:
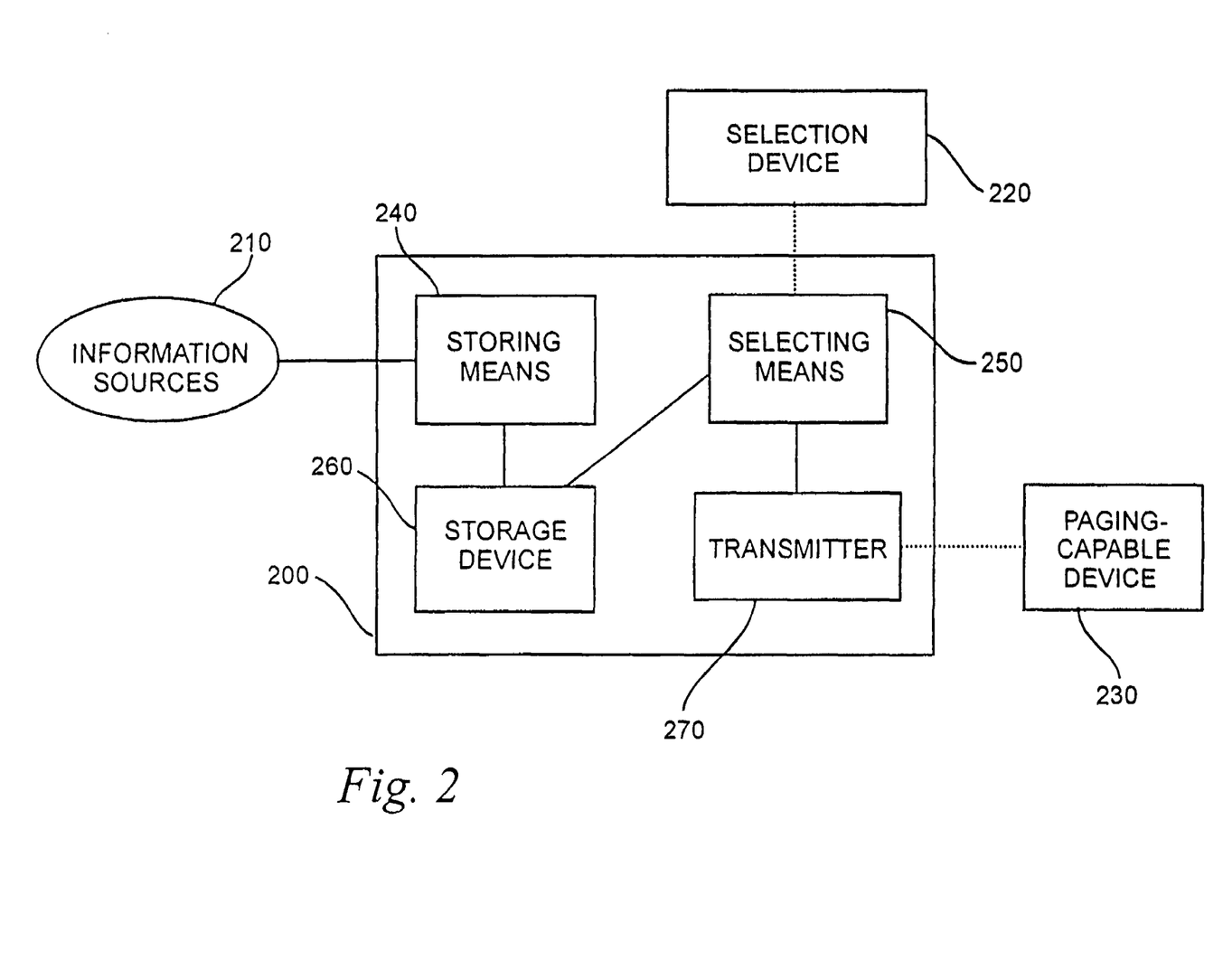
FIG. 2 is a block diagram of an enhanced paging system of a first preferred embodiment.

FIG. 2 illustrates a first preferred embodiment for providing user-selected information to a paging-capable device. There, an enhanced paging system 200 is responsive to information sources 210 and a selection device 220 and can transmit information to a paging-capable device 230, such as a pager 100 (FIG. 1). As used herein, "responsive to" can mean directly responsive to or indirectly responsive through one or more components.

The enhanced paging system 200 comprises a storing means 240, selecting means 250, a storage device 260, and a transmitter 270. The storing means 240 is coupled to the storage device 260 and is responsive to the information sources 210. As used herein, the term "coupled to" can mean directly coupled to or indirectly coupled through one or more components. The selecting means 250 is coupled to the transmitter 270 (which can transmit information to the paging-capable device 230) and the storage device 260 and is responsive to a selection device 220, which can be different from the paging-capable device 230. The above-listed components can be used to provide a user with control over what information will be sent to his paging-capable device and when it will be received, as described below.

Storing means 240 automatically stores in the storage device 260 information that is continuously sent to it by the information sources 210. The storing means 240 can also index the information and format it for storage in the storage device 260. Unlike in some of the systems of the prior art, the storing means 240 does not filter the content of the information before it stores it. An information source can be a telephone network, through which, for example, a person transmits information such as paging codes or voice mail. An information source can also be a computer network (such as the Internet), through which data is transmitted. For example, the storing means 240 can receive e-mail and news headlines and summaries from user-subscribed services on the Internet and store them in the storage device 260. As can be seen by these examples, the information stored in the storage device 260 can be information typically addressed to and/or accessible by only one user (e.g., e-mail, paging codes, and voice mail) or can be information typically addressed to and/or accessible by a plurality of users (e.g., news headlines).

Using the selection device 220, the user selects at least a portion of the automatically-stored information to be sent to his paging-capable device 230. The selection can be based on content, time the information was received, the source of the information, or any other restriction. The selecting means 250 retrieves the selected information from the storage device 260, formats it for transmission, and sends it to the paging-capable device 230 via the transmitter 270. With such a system, the user, not the information source, controls what information the paging-capable device 230 receives and when the information will be received, thereby providing a solution to the problems described in the Background section above.

Second Preferred Embodiment

In a second preferred embodiment, instead of merely accepting information sent to it by the information sources 210, the storing means 240 comprises intelligent-agent software that seeks out specific information in the information sources 210 and automatically stores it in the storage device 260. For example, if the user generally instructs the intelligent agent software that he is looking for a particular used car, the intelligent-agent software can search Web pages on the Internet for used-car dealers and private sellers to obtain information such as a seller's location, selling price, and mileage of a car offered for sale.

In addition to being instructed by a user, the intelligent agent software can automatically seek out information based on inferences from the user's past conduct. For example, if the user frequently purchases books by a particular author, the intelligent agent software can seek out and store information regarding that author's upcoming releases. Once this information is stored in the storage device 260, the user can select it for transmission to his paging-capable device 230, as described above. In this way, intelligent agent software presents the user with a time-saving alternative to browsing the growing number of information sources for information of interest.

Intelligent-agent software can also be used to send critical information to the user in real time and automatically store non-critical information in the storage device 260. When information is received from the information sources 210, the intelligent-agent software in the storing means 240 and/or selecting means 250 determines whether the information is critical. If the information is critical, the intelligent-agent software transmits the information without user request to the paging-capable device 230 via the transmitter 270. If the information is not critical, the intelligent-agent software stores the information in the storage device 260 as before. In this way, the user will only be disturbed by an alert signal if the information is critical.

For example, based on a user's instruction, the intelligent agent software knows that the user is expecting an e-mail or a telephone page from a particular person. Using the e-mail address of received messages or the phone numbers associated with incoming paging codes along with a caller-identification service, the intelligent-agent software can determine who is sending the information, and hence, whether to immediately send the information to the user without his request. The intelligent agent software also can infer from the user's past conduct to make a determination of whether information is critical. For example, the software can transmit the paging codes of a person whose messages the user regularly returns upon receipt of that information, rather than store the information for later retrieval.

Additionally, intelligent-agent software can alert the user that more detailed information is available from the information sources 210 by transmitting a message to the paging-capable device 230. For example, if the intelligent-agent software provides the user with the latest price of a company's stock, it can alert the user that more information about that company is available. The software can also alert the user of this information when he is using the selection device 220.

Third Preferred Embodiment

Figure 3:
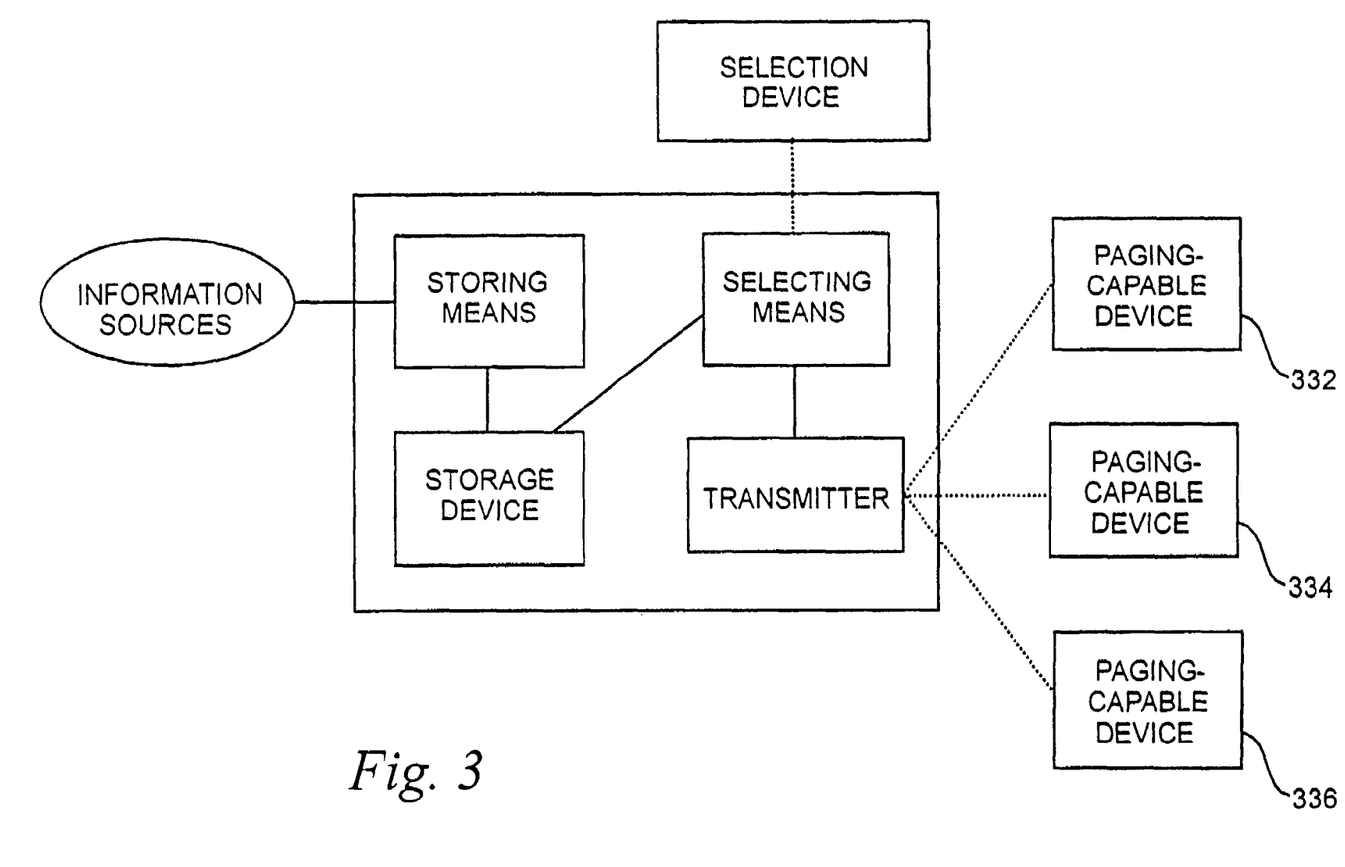
FIG. 3 is a block diagram of an enhanced paging system of a third preferred embodiment.

FIG. 3 illustrates a third preferred embodiment in which a plurality of paging-capable devices 332, 334, 336 are present. In this integrated information environment, the user can designate a particular paging-capable device to receive certain information. For example, if the user has a pager and a paging-capable personal data assistant, the user can choose to send all paging codes received in the last hour to the pager and can choose to send all received e-mail to the personal data assistant.

Fourth Preferred Embodiment

Figure 4:
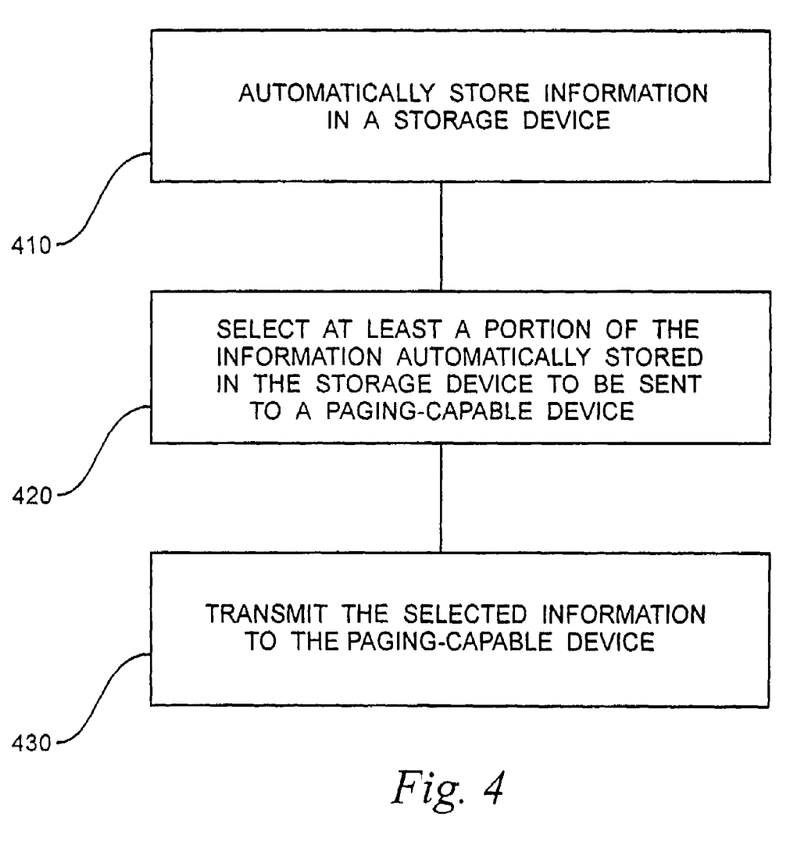
FIG. 4 is a flow chart of a method of a fourth preferred embodiment.

FIG. 4 is a flow chart of a method of a fourth preferred embodiment for providing user-selected information to a paging-capable device. As shown in FIG. 4, the method of the fourth preferred embodiment comprises the steps of automatically storing information in a storage device (step 410), selecting at least a portion of the information automatically stored in the storage device to be sent to a paging-capable device, the selecting being made from a selection device (step 420), and transmitting the selected-information to the paging-capable device (step 430). The selection device can be any device including a paging-capable device, which may or may not be the device receiving the requested information. Intelligent-agent software can be used to seek out information, per a user's request or by inferring from the user's past conduct, for storage in step 410.

Figure 5:
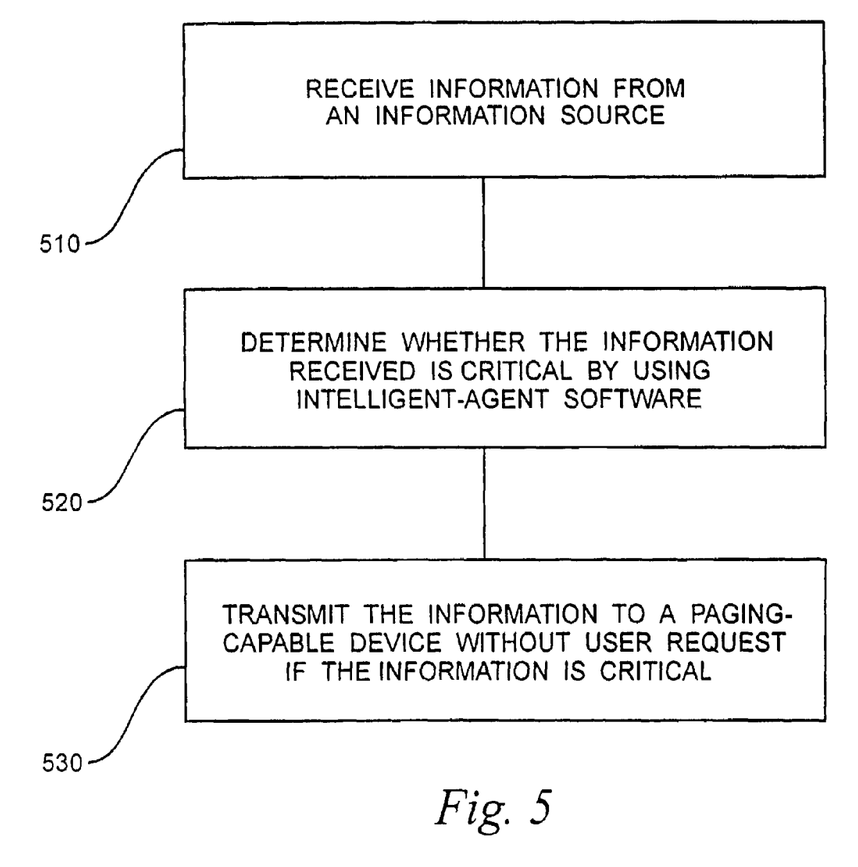
FIG. 5 is a flow chart of an alternate method of the fourth preferred embodiment.

FIG. 5 is a flow chart of an alternative method for providing user-selected information to a paging-capable device. There, information is received from an information source (step 510). Intelligent-agent software determines whether the information received in step 510 is critical, such as by using a caller-identification service, the user's past conduct, or a user's instruction (step 520). If the information is critical, it is transmitted to the paging-capable device without user request (step 530). The other steps of this alternative method are as described above.

Each of the above methods can comprise the additional step of transmitting a message to the paging-capable device indicating that additional information, which is recognized by intelligent-agent software, can be downloaded from an information source. Each method can also comprise the step of selecting a particular paging-capable device to receive the selected information and the step of facilitating user selection of information, for example, by listing the contents of the information stored in the storage device 260 or by listing selection options. As described below, an interactive voice response (IVR) system can be used to accomplish such facilitating.

For each of the preferred embodiments described above, "information sources" includes, but is not limited to, phone networks and computer networks, such as the Internet. "Information" includes, but is not limited to, information which can be addressed to a group of users (e.g., sports information, weather information, business reports, and news summaries) and, unlike the information in the '446 and '843 patents, information typically addressed to and/or accessible by only one user (e.g., e-mail, paging codes, and voice mail).

The storage device 260 can be a hard drive in which information is stored in a database, and the selection device 220 can be any device which allows a user to select at least a portion of information stored in the storage device 260. Such selection devices include, but are not limited to, telephones, computers, and paging-capable devices.

As mentioned above, the selecting means 250 can comprise a system for presenting the user with selection choices regarding the information he wishes to receive, thereby facilitating user selection of information. For example, an interactive voice response (IVR) interface can be used. The IVR interface presents a series of menus to the user, allowing him to make a selection. In this way, the IVR interface facilitates the selection and retrieval of information since the user need not memorize a predetermined key combination to select a particular category of information, as in the systems of the prior art. For example, the IVR interface can list all categories of information stored in the storage device. Using a series of menus, the user can select to receive, for example, all stored information, specific categories of information (e.g., all telephone pages and all business articles from a particular Web site), or a subset of the categories (e.g., all telephone pages from family members and all business articles that were posted on a Web site after the close of the market). Additional restrictions (based on, for example the time the information was received and the source of the received information) can be applied as well.

A menu-based system similar to that of the IVR interface can be implemented on a selecting means 250 comprising a computer-network interface wherein the selection device 220 comprises a computer. The menu-based system would, like the IVR interface, present the user with selection choices regarding the information he wishes to receive. For example, a Web page on the Internet can provide a user with a listing of the contents of the storage device 260. Using his computer, the user can select the information listed on the Web page. With both systems, the user does not have to worry about remembering a predetermined code to request information, as in the prior art systems. With these preferred embodiments, the user is guided through his selection with a series of interactive prompts.

The storing means 240 and selecting means 250 can comprise a microprocessor implementing a software application or a devoted hardwired component. While the storing means 240 and selecting means 250 are shown in FIGS. 2 and 3 as two separate components, it is important to note that they may be combined in one unit.

Although selecting means 250 and the paging capable devices are shown as separate components in FIGS. 2 and 3, the selection device 220, as mentioned above, can be the same as or different from the paging-capable devices selected to receive information.

Any means can be used to couple the information sources 210 to the storing means 240 as well as to couple the selection device 220 to the selecting means 250. For example, the components can be coupled through a telephone network, a computer network, or radio or infrared links. Means for transmission from the transmitter 270 to the paging-capable device 230 is well known in the art.

It is intended that the foregoing detailed description be understood as an illustration of selected forms that the invention can take and not as a definition of the invention. It is only the following claims, including all equivalents, which are intended to define the scope of this invention.

What is claimed is:

1. A method of managing delivery of user-selected information to a wireless device, the method comprising:

automatically storing information received from an information source;

receiving a designation of the wireless device;

transmitting selection choices regarding the automatically-stored information to a selection device different from the wireless device, wherein the selection device different from the wireless device comprises a computer, and wherein the selection choices are transmitted by presenting a plurality of different categories of information to a user of the computer via a web page displaying a menu of the different categories of information;

receiving a first user selection from the computer, the first user selection comprising at least one of the plurality of different categories of information, the first user selection indicating a selected portion of the stored information, the selected portion comprising an alert;

receiving a second user selection comprising a selected delivery time; and transmitting the selected portion to the wireless device over a radio channel at a time based on the selected delivery time.

2. The method of claim 1, further comprising transmitting a second portion of the stored information, the second portion associated with the selected portion, the second portion including further detailed information with respect to the selected portion.

3. The method of claim 1, wherein the plurality of different categories includes business articles and email.

4. The method of claim 1, wherein the selected delivery time includes a range of available delivery times.

5. An information storage and communication system to manage delivery of user-selected information to a selected messaging device, the system comprising:

a storage device to store information derived from an information source;

a computer network interface responsive to the storage device, the computer network interface to receive a designation of a selected messaging device, to transmit selection choices regarding the stored information to a selection device different from the selected messaging device, wherein the selection device different from the selected messaging device comprises a remote computer system, and to receive a user selection from the remote computer system, the user selection comprising at least one of the plurality of selection choices and the user selection indicating a selected portion of the information stored in the storage device; and a wireless transmitter responsive to the computer network interface.

6. A method of communicating formatted data over a wireless channel to a wireless device, the method comprising:

automatically storing a first set of information and a second set of information received from an information source in a storage device;

transmitting a plurality of information selection choices to a selection device different from the wireless device by displaying an internet web page, the internet web page including the plurality of information selection choices, at least one of the plurality of information selection choices including the first set of information automatically stored in the storage device;

receiving user selected information in response to displaying the internet web page, the user selected information including information responsive to at least one of the plurality of information selection choices;

formatting the user selected information to produce formatted data suitable for wireless transmission; and transmitting the formatted data over a wireless channel to the wireless device.

7. The method of claim 6, wherein the user selected information includes the first set of information and further comprising receiving a user request for further information and transmitting the second set of information in response to receiving the user request.

8. The method of claim 7, wherein the first set of information is a headline and the second set of information is one of a business article and a news article identified by the headline.

* * * * *